(12) United States Patent
Rao et al.

(10) Patent No.: US 10,884,899 B2
(45) Date of Patent: Jan. 5, 2021

(54) OPTIMIZED TRAMPOLINE DESIGN FOR FAST SOFTWARE TRACING

(71) Applicant: International Business Machines Corporation, Armonk, NY (US)

(72) Inventors: Naveen N. Rao, Bangalore (IN); Ananth N. Mavinakayanahalli, Bangalore (IN)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 178 days.

(21) Appl. No.: 16/148,126

(22) Filed: Oct. 1, 2018

(65) Prior Publication Data
US 2020/0104237 A1    Apr. 2, 2020

(51) Int. Cl.
*G06F 11/36* (2006.01)
*G06F 9/30* (2018.01)

(52) U.S. Cl.
CPC ...... *G06F 11/3636* (2013.01); *G06F 9/30069* (2013.01); *G06F 11/3664* (2013.01)

(58) Field of Classification Search
None
See application file for complete search history.

(56) References Cited

U.S. PATENT DOCUMENTS 7,389,494 B1* 6/2008 Cantrill ............... G06F 11/3624
717/125
8,037,459 B2* 10/2011 Mavinakayanahalli .....................
G06F 11/3644
717/129

(Continued)

FOREIGN PATENT DOCUMENTS

CN    103761175 B    4/2014

OTHER PUBLICATIONS

Buck, "An API for Runtime Code Patching", 2000, The International Journal of High Performance Computing Applications, vol. 14, No. 4, Winter 2000, pp. 317-329 (Year: 2000).*

(Continued)

*Primary Examiner* — Hossain M Morshed
(74) *Attorney, Agent, or Firm* — Noah Sharkan, Esq.; Kevin P. Radigan, Esq.; Heslin Rothenberg Farley & Mesiti P.C.

(57) ABSTRACT

Tracing computer software program execution includes copying a software instruction at an instrumentation point within an original instruction stream, and replacing the software instruction with a jump instruction. The jump instruction branches to a multi-level trampoline that includes at least a first-level trampoline specific to an associated software tracing probe, and a second-level trampoline generic to plural software tracing probes. The first-level trampoline preserves partial CPU state and branches to the second-level trampoline, passing it software tracing probe identifying information. The second-level trampoline preserves a remainder of the CPU state, implements software tracing operations in accordance with the software tracing probe, restores the CPU state that it previously preserved, and returns program control to the first-level trampoline. Either the first-level or second-level trampoline may execute or emulate the original instruction. The first-level trampoline restores the CPU state that it previously preserved, and returns program control to the original instruction stream.

20 Claims, 9 Drawing Sheets

(56) References Cited

U.S. PATENT DOCUMENTS

| | | | | |
|---|---|---|---|---|
| 9,430,236 B2* | 8/2016 | Gschwind | ............ | G06F 9/30134 |
| 2003/0135718 A1* | 7/2003 | DeWitt, Jr. | ......... | G06F 11/3476 |
| | | | | 712/227 |
| 2004/0139305 A1* | 7/2004 | Arimilli | .............. | G06F 11/3636 |
| | | | | 712/227 |
| 2005/0246683 A1* | 11/2005 | Usov | ....................... | G06F 21/52 |
| | | | | 717/115 |
| 2013/0262726 A1* | 10/2013 | Zheng | ..................... | G06F 13/26 |
| | | | | 710/264 |
| 2014/0289726 A1* | 9/2014 | Rugina | ............... | G06F 9/45525 |
| | | | | 718/1 |
| 2015/0227776 A1* | 8/2015 | Zhang | ................ | G06K 9/00986 |
| | | | | 382/103 |
| 2017/0116419 A1* | 4/2017 | Woodward | .............. | G06F 12/10 |
| 2020/0104237 A1* | 4/2020 | Rao | ..................... | G06F 9/30069 |

OTHER PUBLICATIONS

Buck, "An API for Runtime Code Patching", 2000, The International Journal of High Performance Computing Applications (Year: 2000).*

B. Buck et al., "An API for Runtime Code Patching", Computer Science Department, University of Maryland, Nov. 1, 2000, 12 pages.

* cited by examiner

OPTIMIZED TRAMPOLINE DESIGN FOR FAST SOFTWARE TRACING

BACKGROUND

1. Field

The present disclosure relates to software tracing. More particularly, the disclosure concerns software tracing using trampolines.

2. Description of the Prior Art

By way of background, new age workloads have necessitated unforeseen innovations in the operating systems space. An area that has also had significant challenge is run-time visibility into kernel and user-space applications, without a need to instrument, recompile and reboot. An additional challenge in this space is that of speed. A problem that happens in the normal course of software execution should not be masked due to the overheads imposed by tracing it. Thus, tracing needs to be extremely fast, be it in the kernel or outside it.

Traditional dynamic tracing mechanisms used by software debuggers work on the principle of replacing an instruction at an instrumentation location with a architecture-specified trap or equivalent (sometimes an illegal) instruction, that causes the processor to generate an exception. A "handler" run in the exception context may then perform desired debugging actions, such as collecting relevant trace data for further analysis. This method has significant overhead due to the exception processing and instruction level manipulation.

A more recent instrumentation approach uses a branch instruction to jump to a custom trampoline in lieu of a trap/illegal instruction to generate an exception at a point of interest. The trampoline takes on the duty of saving the processor state before invoking a handler. The original instruction is then executed out-of-line (or emulated) before jumping back to the original instruction stream.

In the case of the Linux kernel, Kprobes is the main dynamic tracing technology being used for kernel instrumentation. Early implementations of the Kprobes mechanism worked by replacing the instruction to be traced with a software trap/breakpoint instruction to capture the processor state, before single stepping the original instruction out of line and returning back to the original instruction stream. This involves one or two exceptions, depending on the processor architecture, which introduces inefficiency. More recently, a jump optimization of Kprobes, known as Optprobes, has been introduced as a way to boost Kprobes performance by branching to a trampoline for executing the handler, rather than taking an exception.

Different architectures have different challenges in implementing the Optprobes mechanism. On CISC processors, the branch instruction needs to be at least 5 bytes, which necessitates extensive checking as to whether the full 5 instructions can be replaced without fear of a jump landing in the midst of it. On RISC processors, the primary challenge arises from the limitation of a standard instruction size, which in turn imposes a restriction on the range within which the optprobe trampoline needs to be relative to the jump origin. In other words, on RISC architectures, the trampoline location has to be within a certain distance of the instruction being probed due to architectural limitations of how far a relative branch can go. This restriction necessitates reserving a certain amount of space as part of the kernel text area for usage as optprobe trampolines. Because this is part of the kernel text area, it is desirable to limit this reserved area to a smaller size.

Ideally, it would be prudent to use a single trampoline for all probes. However, this necessitates the need to lookup the kprobe data structure for identifying the handlers to call, which slows performance. This is problematic when tracing a routine that is invoked very regularly and could essentially mask issues that are timing related. On the other hand, different trampolines can be used for each probe by hard coding a pointer to the associated Kprobe data structure as part of the trampoline, enabling improved performance at the cost of using more memory space. The latter approach limits the number of Kprobes that can be optimized at a time due to limitations on the amount of space that can be used.

As an example, on PowerPC® systems, only about 154 probes can be optimized with a 64 k trampoline area. This will decrease with newer functionality being added to enable optimizing conditional branches.

SUMMARY

A method, system and computer program product are provided for tracing computer software program execution. In an embodiment, a software instruction is copied from a memory location representing an instrumentation point within an original instruction stream of the computer software program. The original instruction is replaced with a jump instruction at the instrumentation point. The jump instruction causes program control to branch to a multi-level trampoline that includes at least a first-level trampoline and a second-level trampoline. The first-level trampoline is specific to an associated software tracing probe. The second-level trampoline is generic to plural software tracing probes. The first-level trampoline performs initial software-tracing house-keeping operations to preserve partial CPU state, then branches to the second-level trampoline while passing identifying information thereto about the first-level trampoline's associated software tracing probe. The second-level trampoline performs additional software-tracing house-keeping operations to preserve a remainder of the CPU state, implements software tracing operations in accordance with the first-level trampoline's associated software tracing probe, restores the CPU state that it previously preserved, and returns program control to the first-level trampoline. The original instruction is executed out-of-line or emulated by one of the trampolines of the multi-level trampoline. The first-level trampoline restores the CPU state that it previously preserved, and returns program control to the original instruction stream of the computer software program at an instruction determined by a result of the out-of-line execution or emulation of the original instruction.

BRIEF DESCRIPTION OF THE DRAWINGS

The foregoing and other features and advantages will be apparent from the following more particular description of example embodiments, as illustrated in the accompanying Drawings.

DETAILED DESCRIPTION

Figure 1:
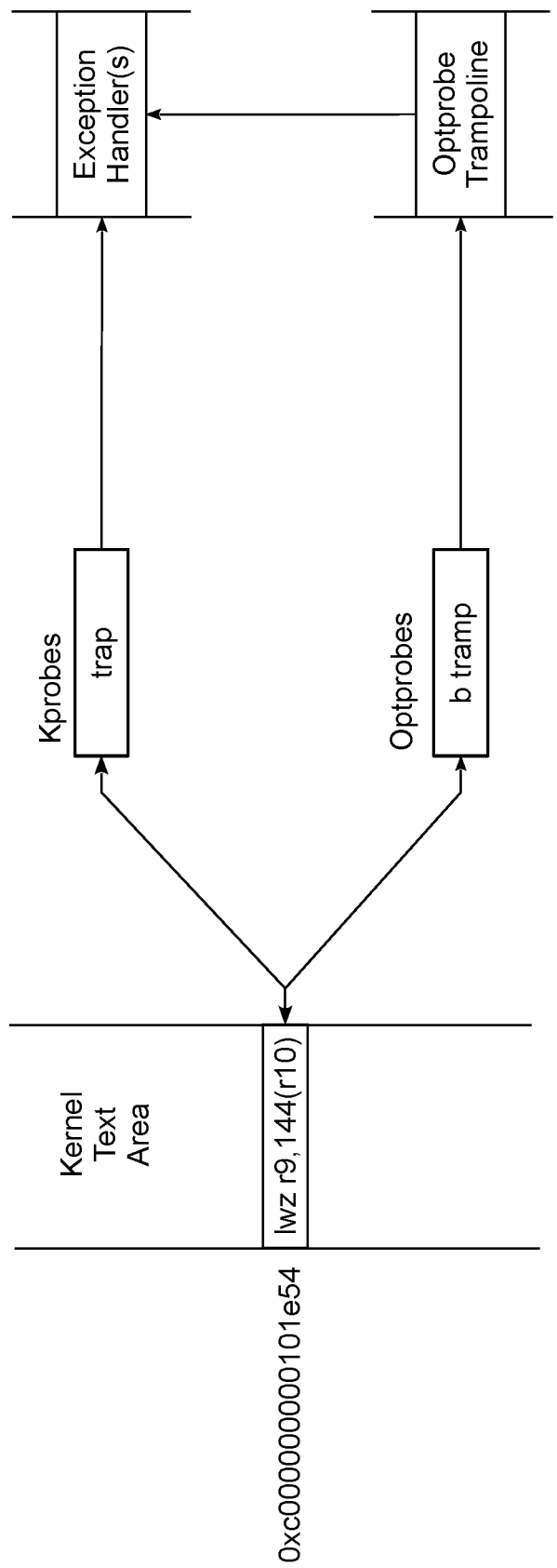
FIG. 1 is a functional block diagram showing prior-art Kprobes and Optprobes software tracing mechanisms.

Turning now to the figures, wherein like reference numerals represent like elements in all of the several views, FIG. 1 illustrates an example implementation of the prior art Kprobes and Optprobes dynamic tracing mechanisms discussed in the Background section above. In this example, a kernel text area has been instrumented to probe a software instruction "lwz r9,144(r10)" at the 64 bit memory address 0xc000000000101e54, which is the instrumentation location. The "lwz r9,144(r10)" instruction happens to be an assembly language instruction for a PowerPC® (RISC) processor. This instruction loads a word (32 bits) from the effective address of (register r10+144) into register r9, and zeroes the upper word (32 bits) of register r9. Although FIG. 1 assumes a RISC processor architecture, this is for purposes of example only. Other processor architectures that support trap-based or trampoline-based software tracing mechanisms could also be used, such as an x86 CISC architecture.

The upper-right portion of FIG. 1 illustrates salient aspects of the Kprobes mechanism. When a kprobe is registered for the "lwz r9,144(r10)" instruction at the 0xc000000000101e54 instrumentation location, a copy of the instruction is retained in a kprobe data structure that defines the kprobe and its handler(s) (labeled "Exception Handler(s) in FIG. 1). The first byte(s) of the instruction is/are replaced with an architecture-specific trap instruction (labeled "trap" in FIG. 1) that causes the processor to generate an exception. By way of example, for a PowerPC® RISC implementation, the trap instruction may be implemented as a software breakpoint using the "tw" instruction. For an x86 CISC implementation, the trap may be implemented as a software breakpoint using the "int 3" instruction.

When the CPU hits the breakpoint, an exception occurs. The normal kernel exception handler saves the CPU's registers and passes control to the Kprobes mechanism. The Kprobes mechanism identifies the kprobe that was registered for the instrumentation point, then runs the kprobe's pre_handler (one of the "Exception Handler(s)" in FIG. 1) to perform desired debugging actions, passing the handler the addresses of the kprobe data structure and the saved registers. The pre_handler allows the kprobe user to gather desired debugging information before the probed instruction is executed. Depending on the return value from the pre_handler, the CPU's instruction pointer is set to the copy of the original instruction corresponding to the probe-point location, and appropriate flags are set to single-step the instruction out-of-line. Alternatively, for certain instructions (such as branch instructions requiring delay slot handling), the instruction may be emulated. Control returns to the Kprobes mechanism after the instruction copy is executed out-of-line (or emulated). If the kprobe has an associated post_handler, it will now be called. The post_handler (which may be another one of the "Exception Handler(s) in FIG. 1) allows the kprobe user to gather information just after the probed instruction is executed. Following the post_handler, or following execution of the instruction copy if there is no post_handler, the Kprobes mechanism causes normal instruction processing to resume by setting the instruction pointer to an appropriate instruction that follows the probe-point location. As noted in the "Background" section above, this method has significant overhead due to the exception processing and instruction level manipulation.

The lower-right portion of FIG. 1 illustrates salient aspects of the Optprobes mechanism, also known as Kprobes jump optimization. If this optimization is enabled, an optimized kprobe (a.k.a., optprobe) is registered for the 0xc000000000101e54 instrumentation location and a copy of the "lwz r9,144(r10)" instruction is retained in an optprobe data structure that defines the optprobe and its handler(s). The handler(s) may be the same Exception Handler(s) used by the Kprobes mechanism. Instead of replacing the original instruction with a breakpoint, it is replaced with a branch-to-trampoline instruction (labeled "b tramp" in FIG. 1) that jumps to a custom trampoline (labeled "Optprobe Trampoline" in FIG. 1). The trampoline takes on the duty of saving the processor state before invoking the kprobe's pre_handler. The original instruction is then executed out-of-line (or emulated) before jumping back to the original instruction stream.

As noted in the Background section above, different architectures have different challenges in implementing Optprobes. On CISC processors, the branch-to-trampoline instruction that replaces the original instruction needs to be at least 5 bytes, which necessitates extensive checking as to whether the full 5 instructions can be replaced without fear of a jump landing in the midst of it. On a RISC processor, the primary challenge arises from the limitation of a standard instruction size, which in turn imposes a restriction on the range within which the optprobe trampoline needs to be relative to the instrumentation point.

Figure 2:
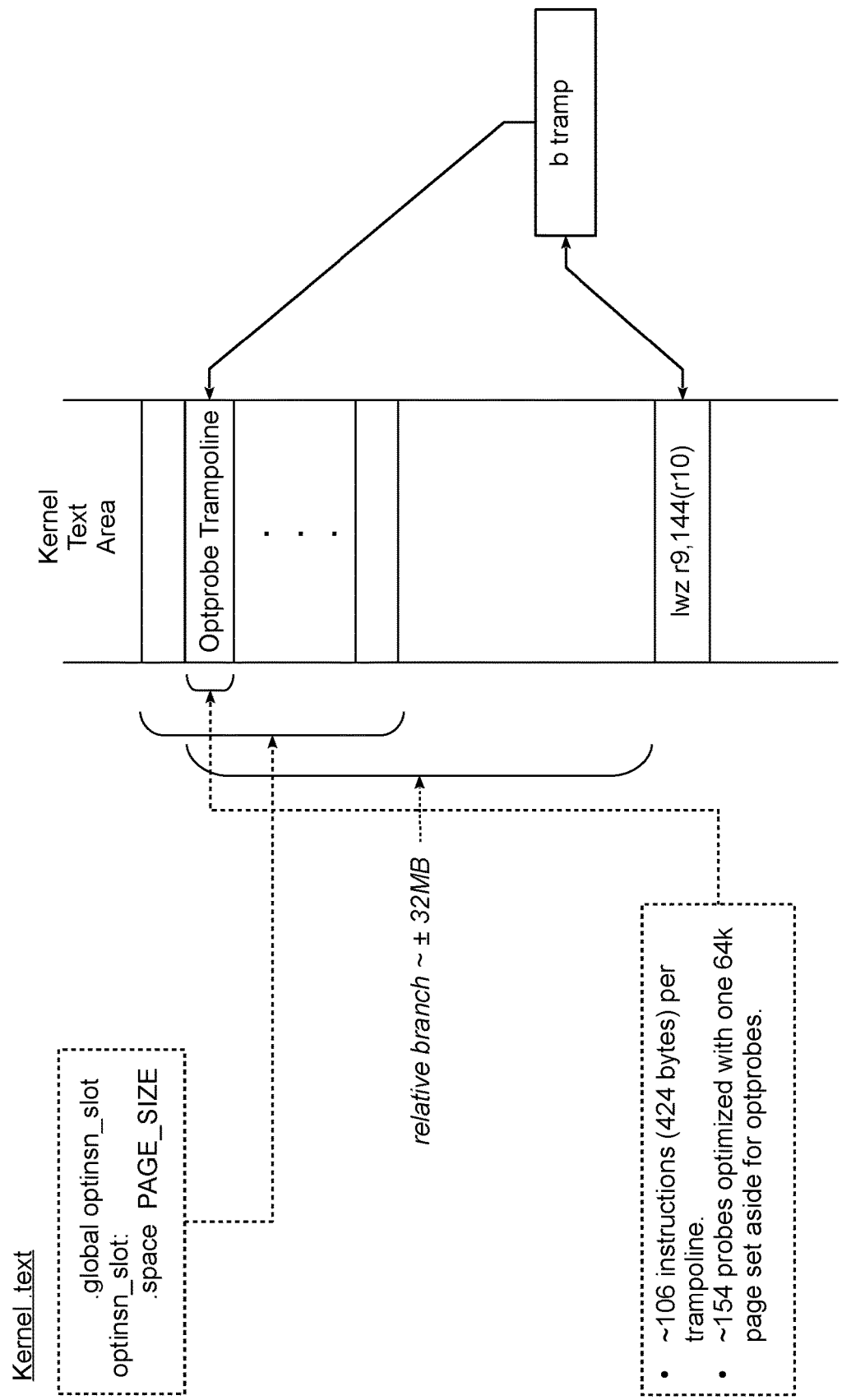
FIG. 2 is a functional block diagram showing details of a single-level trampoline implemented by a prior-art Optprobes software tracing mechanism.

FIG. 2 is illustrative. It shows that the trampoline location has to be within a certain distance of the instruction being probed due to architectural limitations of how far a relative branch can go. For a PowerPC® CPU, the branch distance is +/−32 MB. This restriction necessitates reserving a certain amount of space as part of the kernel text area for usage as optprobe trampolines, such as one 64 k (PAGE_SIZE) memory page. Because this is part of the kernel text area, it is desirable to limit the reserved area as much as possible.

As previously discussed in the "Background" section above, it would be prudent to use a single trampoline for all probes. However, this necessitates the need to lookup the optprobe data structure for identifying the handlers to call, which slows performance. This is problematic when tracing a routine that is invoked very regularly and could essentially mask issues that are timing related. On the other hand, different trampolines can be used for each probe by hard coding a pointer to the associated optprobe data structure as part of the trampoline, enabling improved performance at the cost of using more memory space. The latter approach limits the number of optprobes that can be registered at one time due to limitations on the amount of space that can be used.

As an example, on the PowerPC® RISC system shown in FIG. 2, each optprobe trampoline currently includes 106 machine instructions for a total size of 424 bytes. This allows optimizing a total of 154 probes by dedicating a 64 k page for Optprobes trampolines. This will decrease with newer functionality being added to enable optimizing conditional branches.

Turning now to FIGS. 3-7, a technique will be described for implementing an improved software tracing mechanism that employs a two-level trampoline to strike the right balance between performance and memory usage. The disclosed two-level trampoline can be used to enhance the exiting Optprobes mechanism, and the embodiment now to be described is discussed in the context of an Optprobes environment. It should be understood, however, that the disclosed technique may be used in conjunction with any compatible mechanism for tracing computer software program execution.

Figure 3:
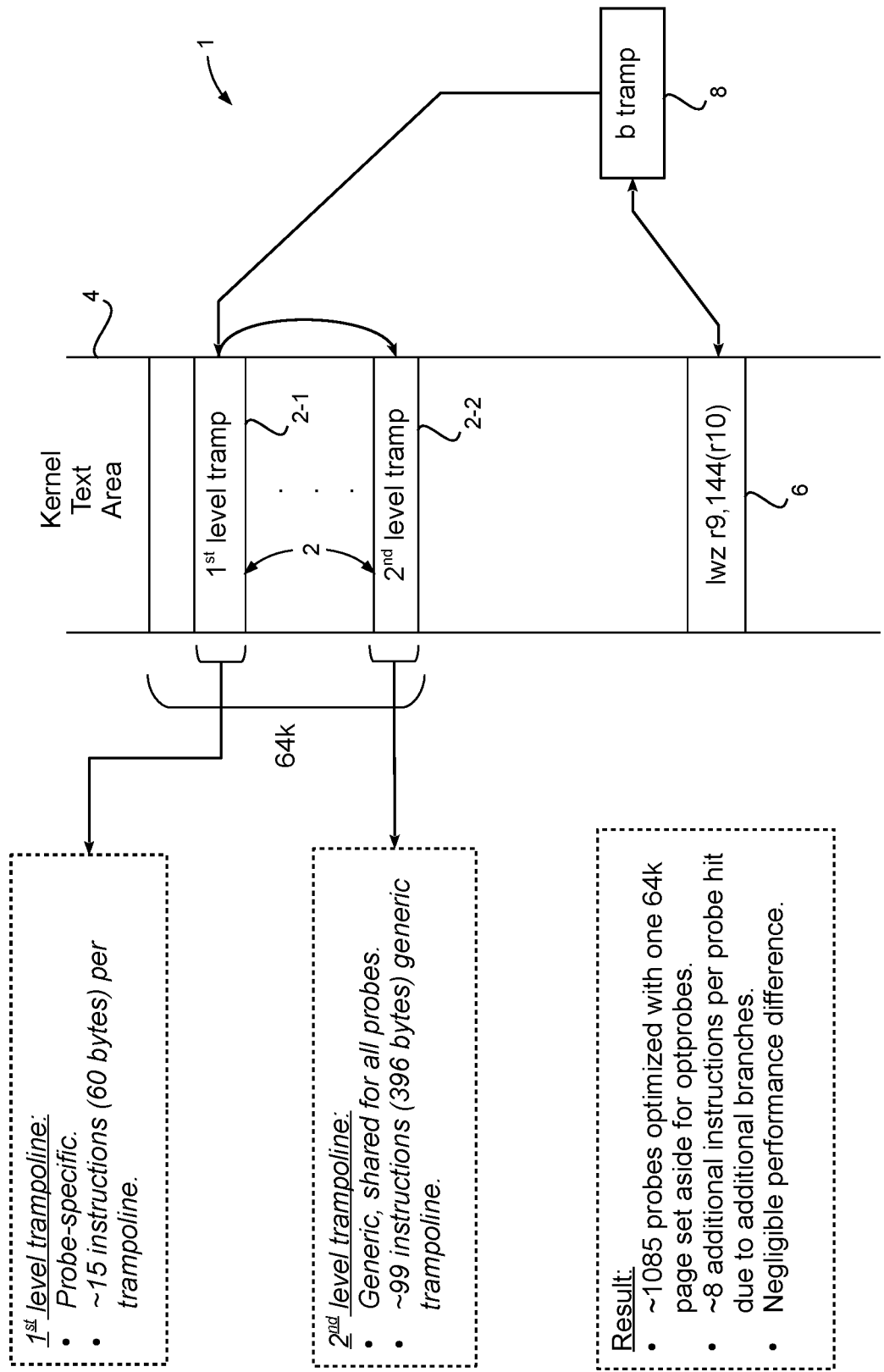
FIG. 3 is a functional block showing an optimized two-level trampoline design for software tracing according to an embodiment of the present disclosure.

FIG. 3 illustrates a computer software tracing mechanism 1 that includes an example two-level trampoline 2 according to an embodiment of the present disclosure. The two-level trampoline 2 has been loaded into a kernel text area 4 of a computer program memory (not shown in FIG. 3) for tracing an example computer program software instruction 6 that is also within the kernel text area. The two-level trampoline 2 includes a smaller first-level trampoline 2-1 that is specific to one software tracing probe (e.g., a kprobe, an optprobe, or otherwise), and a larger second-level trampoline 2-2 that is generic to plural (more than one) software tracing probes.

In the illustrated embodiment of FIG. 3, the probe-specific first-level trampoline 2-1 may be reached in the manner used by existing Optprobes implementations, namely, by replacing the instruction 6 to be instrumented (which may be the "lwz r9,144(r10)" instruction discussed in connection with FIGS. 1 and 2) with a branch-to-trampoline instruction 8 (labeled "b tramp" in FIG. 3) that jumps to the first-level trampoline.

The probe-specific first-level trampoline 2-1 may be implemented to perform, initial software-tracing housekeeping operations that are relatively minimal. Such operations may include setting up a probe-specific stack area, saving a small portion of the CPU state, loading up a reference to an associated software tracing probe, and then branching to the generic, second-level trampoline 2-2 that is shared across plural software tracing probes.

The second-level trampoline 2-2 is designed to be reentrant, and uses the stack area allotted by the first-level trampoline 2-1 to perform additional software-tracing housekeeping operations, namely saving the remaining CPU state, and then run the software tracing probe. In an embodiment, the software tracing probe may be a kprobe or optprobe that operates in the manner described above in connection with FIGS. 1 and 2. As previously mentioned, other types of software tracing probes could also be used. After the software tracing probe has completed its work, the second-level trampoline 2-1 restores the CPU state it previously preserved, and program control jumps back to the first-level trampoline 2-1.

In one embodiment, the original instruction is executed out-of-line or emulated by the second-level trampoline. In another embodiment, the original instruction is executed out-of-line or emulated by the first-level trampoline.

The first-level trampoline restores the CPU state that it previously preserved, then branches to return program control to an appropriate instruction that follows the original instruction at the instrumentation point, i.e., an instruction determined by a result of the out-of-line execution or emulation of the original instruction.

Figure 4:
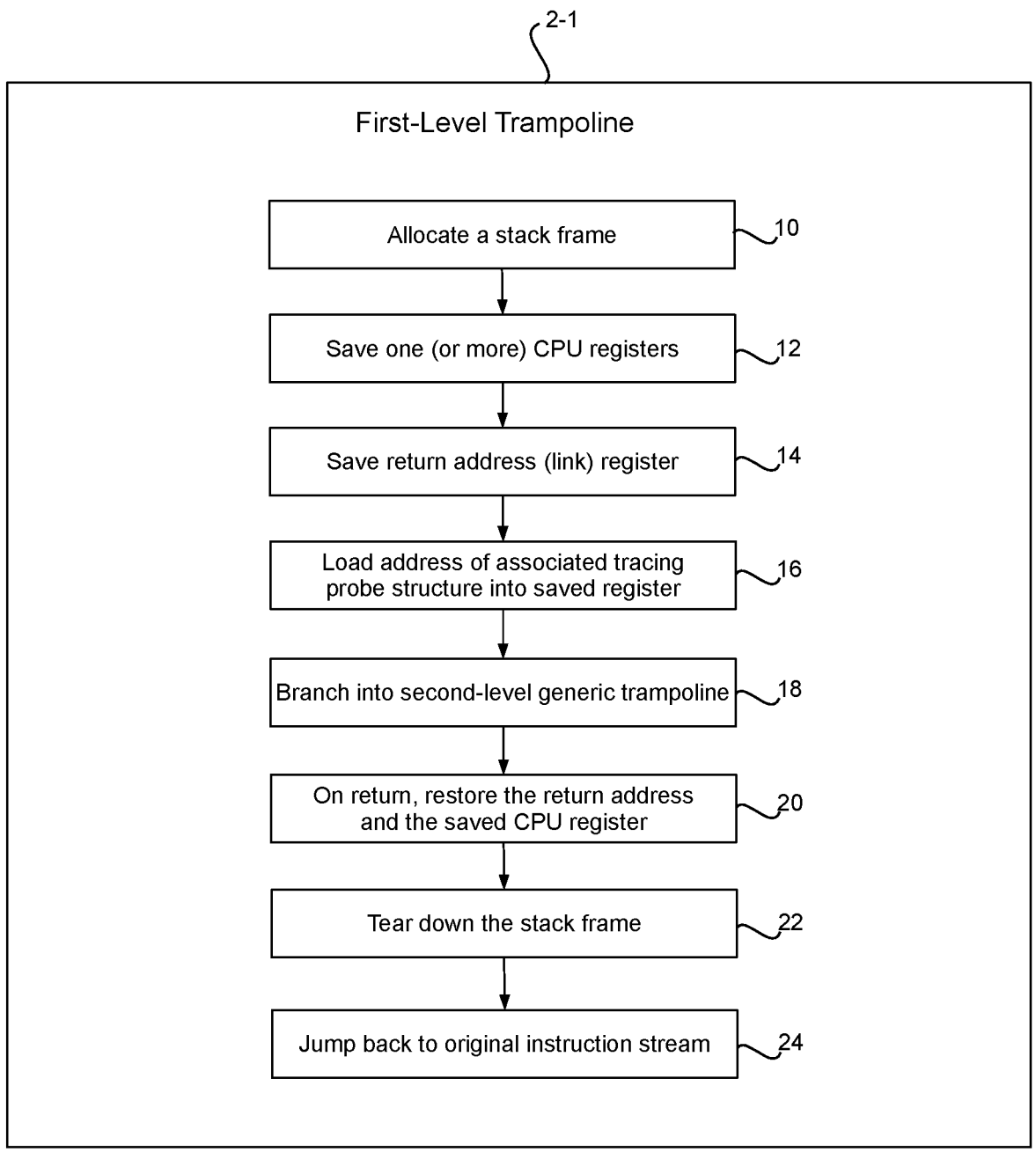
FIG. 4 is a flow diagram showing example operations of a first-level trampoline according to an embodiment of the present disclosure.

FIG. 4 illustrates further details of the first-level trampoline 2-1, according to an embodiment in which the original instruction is executed out-of-line or emulated by the second-level trampoline. Block 10 allocates a probe specific stack frame in a kernel stack area of a computer's program memory (not shown in FIG. 4). Block 12 saves one (or more) of the CPU's general purpose registers (e.g., register "r3" of a RISC CPU) onto the stack frame. Block 14 saves the return address (link) register (e.g., the "lr" register of a RISC CPU) onto the stack frame. The saved return address indicates where processing is to resume in the original instruction stream following the instrumentation point. Block 16 loads the address of an associated tracing probe data structure (e.g., a kprobe or optprobe data structure) into a CPU register that was previously saved in block 12. Block 18 branches to the second-level trampoline 2-2, whose operations are described in more detail below in connection with FIG. 5. On return from the second-level trampoline 2-2, block 20 restores the return address register saved in block 14, and restores the CPU register(s) saved in block 12. Block 22 tears down the stack frame that was allocated in block 10. Block 24 jumps back to the original instruction stream.

Note that software instructions representing one or more of the operations of FIG. 4 may be dynamically generated when the software tracing probe is registered, while instructions representing other parts of FIG. 4's operations may be kept static. For example, the instruction(s) represented by operation 16 may be dynamically implemented by patching/generating code to load the address of the probe-specific data structure.

Figure 5:
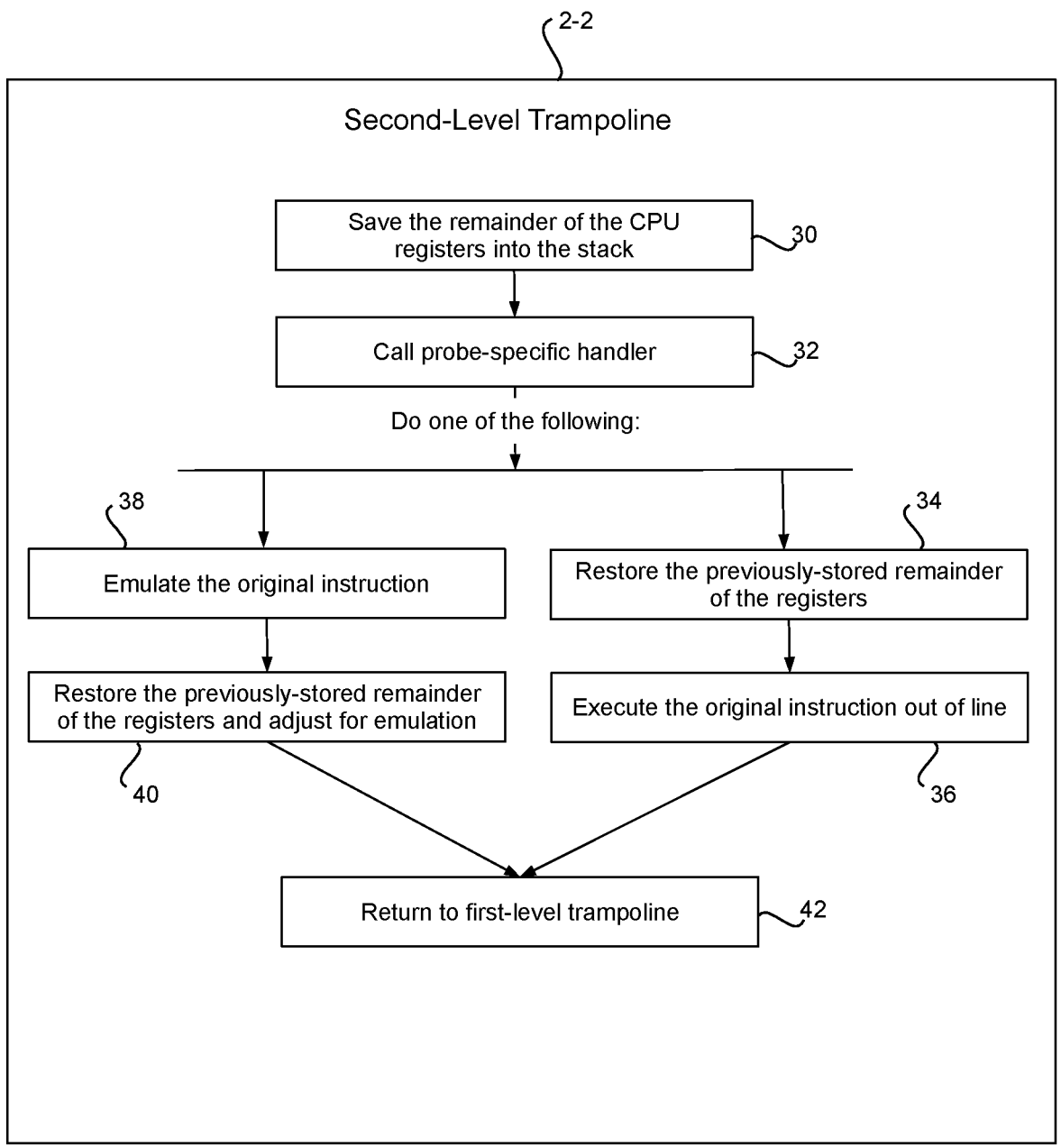
FIG. 5 is a flow diagram showing example operations of a second-level trampoline according to an embodiment of the present disclosure.

FIG. 5 illustrates further details of the second-level trampoline 2-1, according to an embodiment in which the original instruction is executed out-of-line or emulated by the second-level trampoline. Block 30 saves the remainder of the CPU's registers onto the stack frame created by the first-level trampoline 2-1. Block 32 uses the register where the first-level trampoline 2-1 loaded the address of the software tracing probe data structure (in block 16 of FIG. 4) to reference the data structure and call a probe-specific pre-handler specified therein. The second-level trampoline may then either execute the original instruction out of line or emulate it, depending on the instruction, as dictated by the software tracing probe data structure. If the original instruction is to be executed out-of-line, block 34 restores the previously-stored remainder of the CPU registers (saved in block 30) to prepare the CPU state, and block 36 executes the original instruction out-of-line. If the original instruction is to be emulated, block 38 performs the emulation. Block 40 then restores the previously-stored remainder of the CPU registers (saved in block 30) while adjusting the registers to incorporate any changes due to the emulation. Following whichever of blocks 36 or 40 was implemented, block 42 returns program control back to first-level trampoline (at block 20 of FIG. 5).

Figure 6:
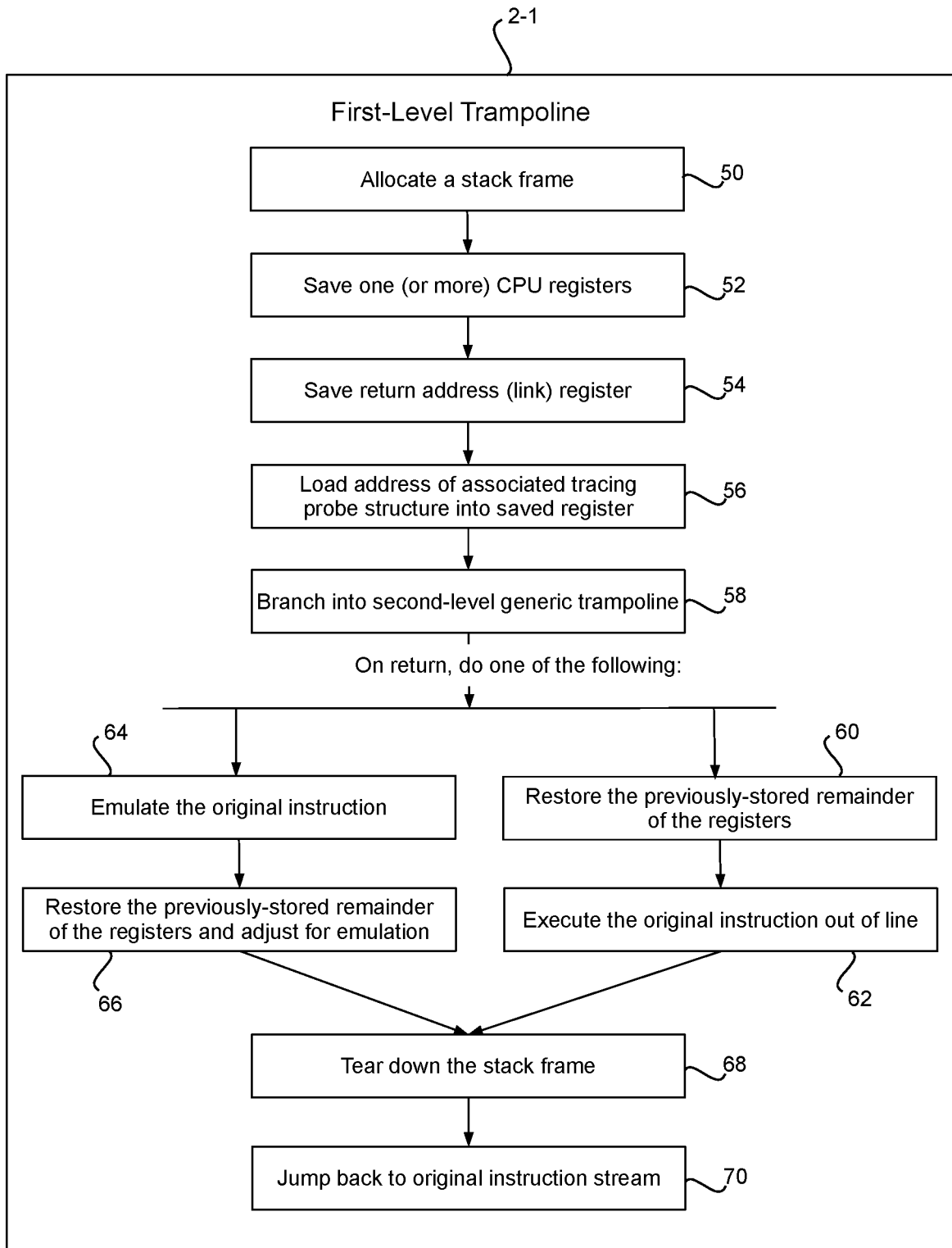
FIG. 6 is a flow diagram showing example operations of a first-level trampoline according to an embodiment of the present disclosure.

FIG. 6 illustrates further details of the first-level trampoline 2-1, according to another embodiment in which the original instruction is executed out-of-line or emulated by the first-level trampoline. Block 50 allocates a probe specific stack frame in a kernel stack area of a computer's program memory (not shown in FIG. 4). Block 52 saves one (or more) of the CPU's registers onto the stack frame. Block 54 saves the link register (return) address onto the stack frame that indicates where processing is to resume in the original instruction stream following the instrumentation point. Block 56 loads the address of an associated tracing probe data structure (e.g., a kprobe or optprobe data structure) into a register that was saved in block 52. Block 58 branches to the second-level trampoline 2-2, whose operations are described in more detail below in connection with FIG. 7.

On return from the second-level trampoline 2-2, the first-level trampoline 2-1 executes the original instruction out-of-line or emulates it. If the original instruction is to be executed out-of-line, block 60 restores the previously-stored one or more CPU registers (saved in blocks 54/56) to prepare the CPU state, and block 62 executes the original instruction out-of-line. If the original instruction is to be emulated, block 64 performs the emulation. Block 66 then restores the previously-stored CPU registers (saved in blocks 54/56) while adjusting the registers to incorporate any changes due to the emulation. Following whichever of blocks 62 or 66 was implemented, block 68 tears down the stack frame that was allocated in block 50. Alternatively, the stack tear-down operation of block 68 might only follow block 66 of the instruction emulation pathway (represented by blocks 64 and 66). For the out-of-line instruction execution pathway (represented by blocks 60 and 62), the stack tear-down operation could be performed between blocks 60 and 62. Block 70 jumps back to the original instruction stream.

Figure 7:
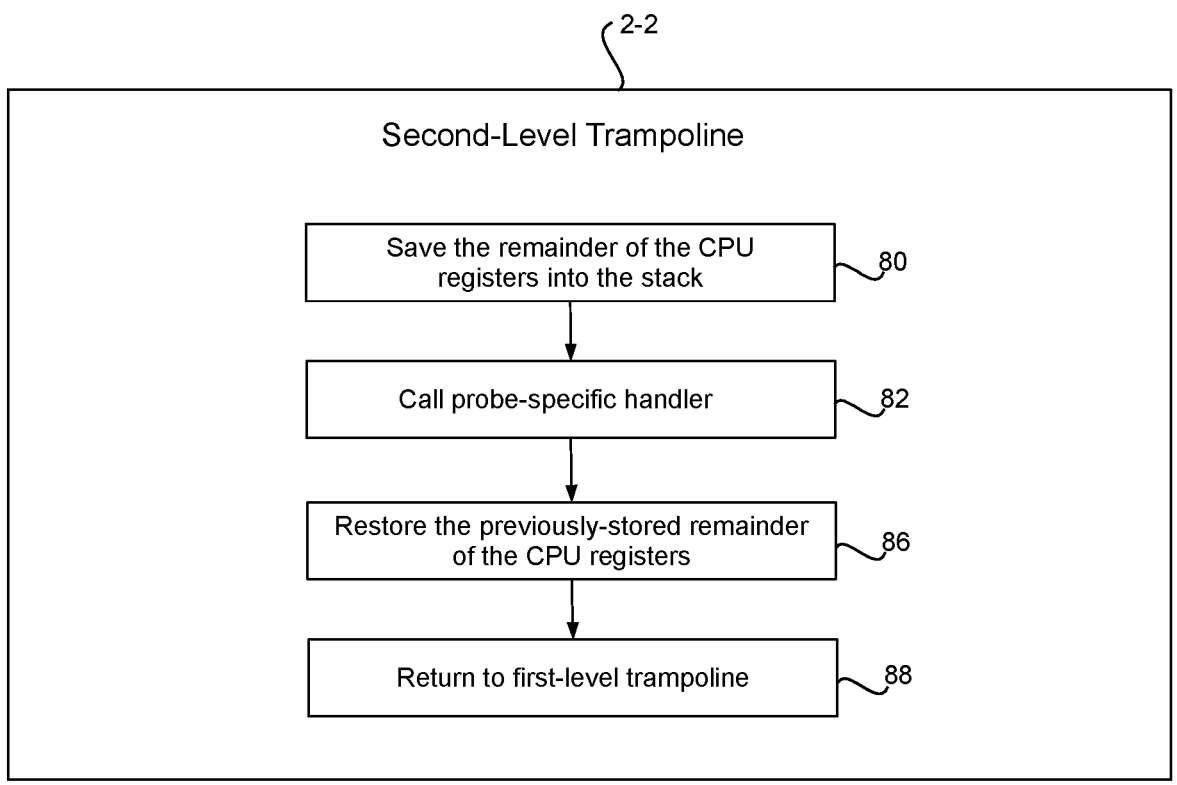
FIG. 7 is a flow diagram showing example operations of a second-level trampoline according to an embodiment of the present disclosure.

FIG. 7 illustrates further details of the second-level trampoline 2-2, according to an embodiment in which the original instruction is executed out-of-line or emulated by the first-level trampoline. Block 80 saves the remainder of the CPU's registers onto the stack frame created by the first-level trampoline 2-1. Block 82 uses the register where the first-level trampoline 2-1 loaded the address of the software tracing probe data structure (in block 56 of FIG. 6) to reference the data structure and call a probe-specific pre-handler specified therein. Block 40 then restores the previously-stored remainder of the registers. Block 88 returns program control back to first-level trampoline (following block 58 of FIG. 6).

In an embodiment, when installing a software tracing probe, the first-level trampoline 2-1 may be allocated from a reserved region of the kernel text area and customized to suit the probe (e.g., by patching/generating code to load the address of the tracing probe data structure per block 16 of FIG. 4). The second-level trampoline 2-2 is generic and may be included in the kernel, such that no customization is needed for this trampoline.

Returning now to FIG. 3, advantages of using the two-level trampoline 2 are illustrated. In the existing Optprobes implementation for PowerPC on Linux, each single-level trampoline includes 106 machine instructions, for a total size of 424 bytes. As previously discussed, this allows optimizing a total of 154 probes by dedicating a 64 k page for Optprobe trampolines. In contrast, the two-level trampoline 2 illustrated in FIG. 3 and the embodiment of FIGS. 4-5 may be implemented such that the custom first-level trampoline 2-1 needs no more than 15 machine instructions (60 bytes), and the generic, shared second-level trampoline 2-2 needs no more than 99 machine instructions (396 bytes). For the same dedicated 64 k page of trampolines, there may now be 1085 tracing probes, which represents a seven-fold improvement over the existing single-level trampoline technique. At the same time, there are only 8 additional machine instructions per probe hit (due to the additional branches), which does not show any real-world slow down in probe-hit performance.

The embodiment of FIGS. 6-7 provides similar advantages over the existing Optprobes implementation.

Figure 8:
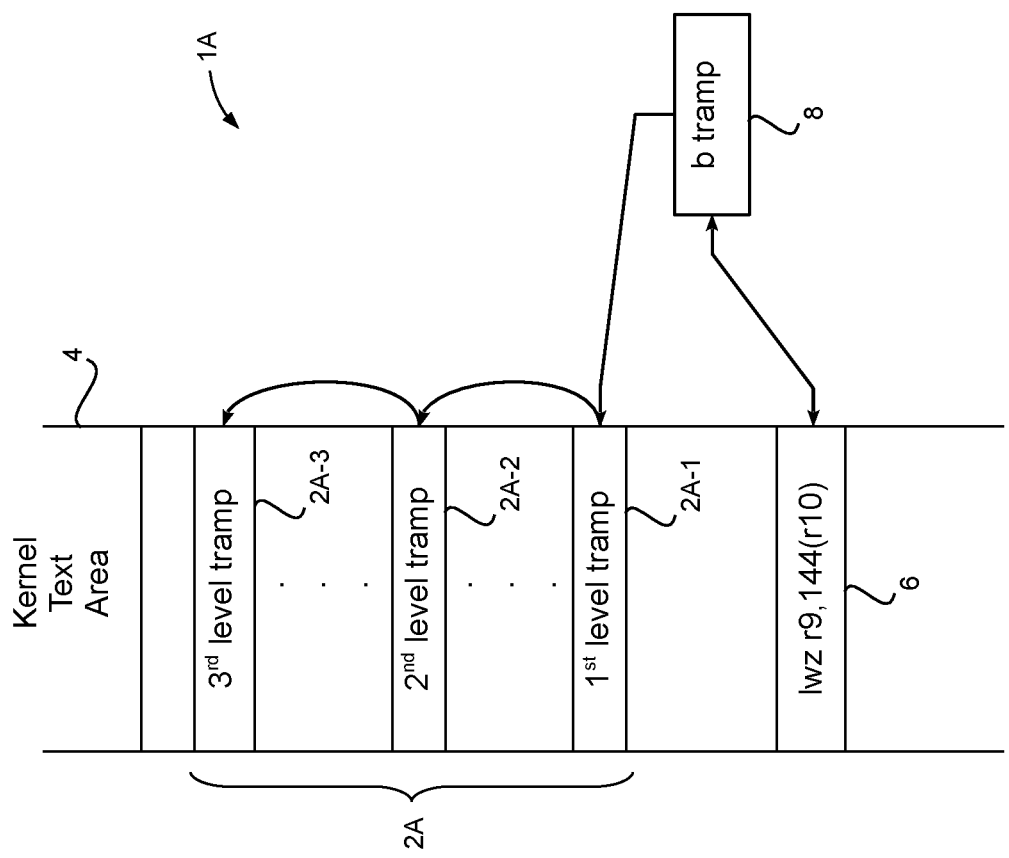
FIG. 8 is a functional block showing an optimized three-level trampoline design for software tracing according to an embodiment of the present disclosure.

Additional embodiments of the disclosed technique may be implemented in which a multi-level trampoline is provided having more than a first-level trampoline and a second-level trampoline. For example, FIG. 8 illustrates an embodiment in which a computer software tracing mechanism 1 that includes an example three-level trampoline 2A. The three-level trampoline 2A has been loaded into a kernel text area 4 of a computer program memory (not shown in FIG. 8) for tracing an example computer program software instruction 6 that is also within the kernel text area. The three-level trampoline 2A includes a first-level trampoline 2A-1, a second-level trampoline 2A-2, and a third-level trampoline 2A-3.

One use case for the three-level trampoline would be when the instrumentation point is not within a maximum jump distance (e.g. 32 MB) from a memory page (e.g. of size 64 k) set aside for the previously-described first-level and second-level trampolines 2-1 and 2-2. Examples of kernel text that may be situated beyond the maximum jump distance include code that is dynamically loaded/generated, such as kernel modules and eBPF filters (for filtering network packets). It is not possible to patch such an instrumentation point with a single branch to the normal first-level trampoline 2-1.

To remedy this situation, a second page of memory (e.g., 64 k) may be reserved near the dynamically loaded/generated code. An instrumentation point in such code may be patched to branch to the new second memory page, wherein a new first-level trampoline 2A-1 may be inserted. The new first-level trampoline 2A-1 may perform the first three operations currently performed by the original first-level trampoline 2-1, namely, operations 10, 12 and 14 of FIG. 4 or operations 50, 52 and 54 of FIG. 6. In other words, the new first-level trampoline 2A-1 may allocate a stack frame, save one (or more) general purpose CPU registers (e.g., register "r3" of a RISC CPU), and save the return address (link) register (e.g., the "lr" register of a RISC CPU). The new first-level trampoline 2A-1 may then branch to the new second-level trampoline 2A-2. This may be handled by loading the address of the new second-level trampoline 2A-2 into the previously-saved general purpose CPU register (e.g., r3), then move it to the previously-saved return address register (e.g., lr), then unconditionally branch to the address of the new second-level trampoline 2A-2 (e.g., using the PowerPC® "blr" instruction). The new second-level trampoline 2A-2 may perform the remaining operations of the original first-level trampoline 2-1 of FIG. 4, namely, operations 16-24 of FIG. 4 or operations 56-70 of FIG. 6. The new third-level trampoline 2A-3 may perform all of the operations performed by the original second-level trampoline 2-2, namely, operations 30-44 of FIG. 5 or operations 80-88 of FIG. 7. When the new third-level trampoline 2A-3 completes its operations, it will return to the new second-level trampoline 2A-2. When the new second-level trampoline 2A-2 completes its operations, it may return to the original instruction stream, or alternatively, to the new first-level trampoline 2A-1 (which will thereafter return to the original instruction stream).

Figure 9:
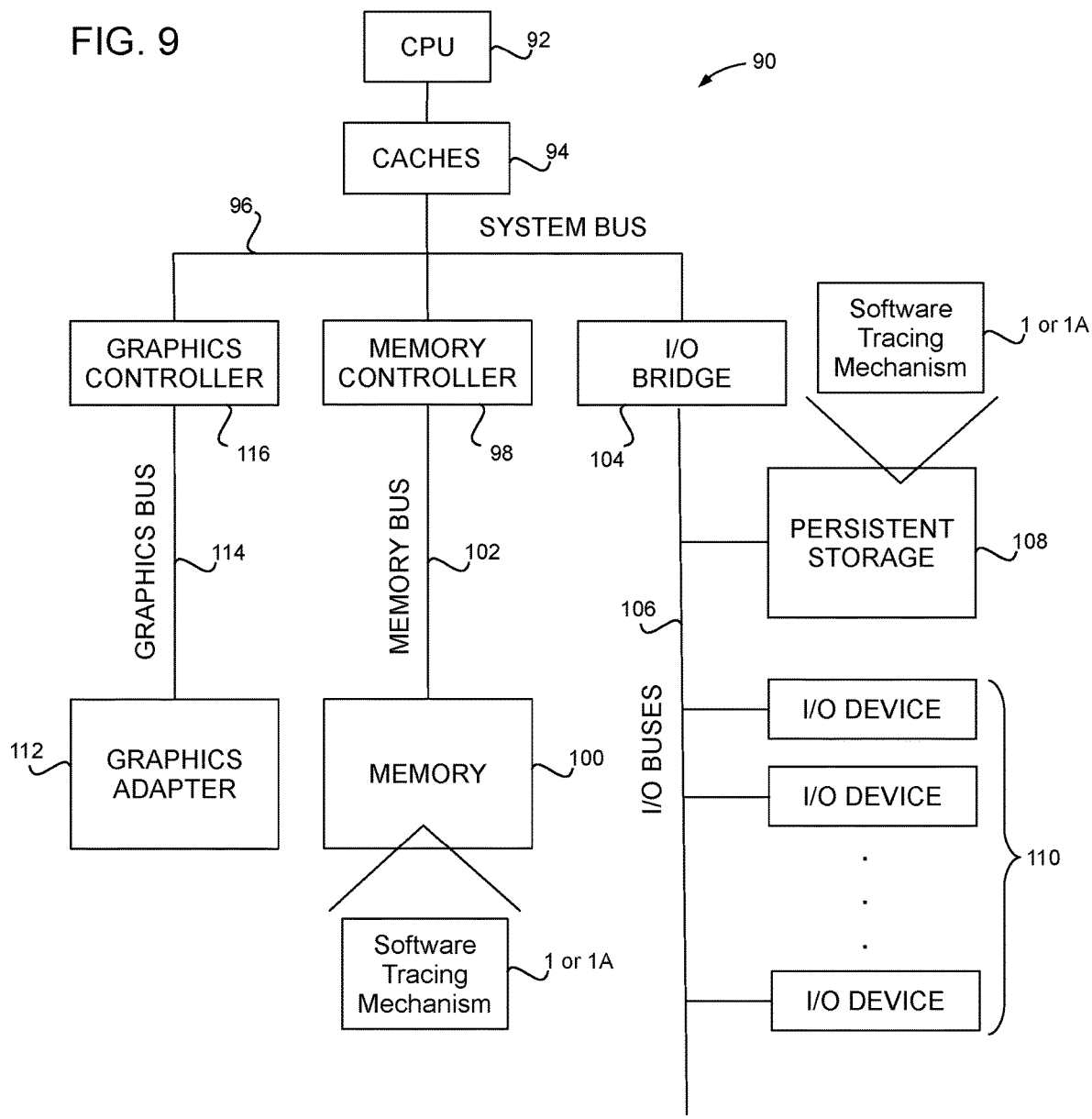
FIG. 9 is a functional block diagram showing an example computer system that may be used to implement an optimized two-level trampoline design for software tracing according to an embodiment of the present disclosure.

Turning now to FIG. 9, an example computing system 90 is shown that may be used to implement the software tracing mechanism 1 shown in FIG. 3. The computing system 90 supports execution of the software tracing mechanism 1 (or the software tracing mechanism 1A) as computer logic that in turn controls the computing system 90 to perform the operations of FIGS. 3-8. According to one possible embodiment, the computing system 90 may include a CPU 92 that is operably connected via one or more levels of memory caches 94 to a system bus 96. The system bus 96 may also operably connect to a memory controller 98 that is operably connected to a memory 100 by way of a memory bus 102. The memory controller 98 manages information flow between the system bus 96 and the memory bus 102.

As used herein, the term "CPU" includes, but is not necessarily limited to, a single-threaded or multi-threaded central processing unit within a single-core or multi-core processor device (each core being considered a CPU) that is designed to execute program instruction logic, such as software or firmware. The CPU 92 may be part of a general purpose processor or it may be custom-designed to support the required functions. The CPU 92 may employ any suitable instruction set architecture, such as those found in RISC machines, CISC machines, or otherwise.

The memory 92 may include RAM (Random Access Memory), ROM (Read-Only Memory), combinations of RAM and ROM, or any other type of tangible storage medium capable of storing data in digital computer readable form.

The CPU 92, the memory 100, and the other above-described components may be situated within a single computing node (e.g., as part of a single-node SMP system) or they may be distributed over plural nodes (e.g., as part of a NUMA system or cluster). Other distributed topologies could also be employed.

In an embodiment, additional components of the computing system 90 may include an I/O bridge 104 that manages information flow between the system bus 96 one or more I/O buses 106. A persistent storage device 108 (e.g., a disk drive, a flash memory drive, or any other device capable of persistently storing data in digital computer readable form) may be operably connected to one of the I/O buses 106. Various additional peripheral devices 110 may also be operably connected to one or more of the I/O buses 106. Examples of such peripheral devices 110 may include a keyboard or keypad input device, a pointer input device, a touch-screen, a network interface card (NIC), a USB bus controller, etc.

In an embodiment, the computing system 90 may further include a graphics adapter 112 for generating visual output information (e.g., text and/or graphics) to a display device (not shown). The graphics adapter 112 may be operably connected via a graphics bus 114 to a graphics controller 116 that is in turn operably connected to the system bus 96. The graphics controller 116 manages information flow between the system bus 96 and the graphics bus 114.

It should be understood that the foregoing description of the computing system 90 is for purposes of illustration only, and that other components and arrangements may also be used to implement various features and functions thereof.

The software tracing mechanism 1 may be variously implemented in software, firmware, or a combination thereof, that runs on the computing system 90. If implemented in software, the software tracing mechanism 1 (or the software tracing mechanism 1A) may be loaded from the persistent storage 108 into a portion of the memory 100 that includes RAM, such as DRAM or SRAM modules. If implemented in firmware, the software tracing mechanism 1 (or the software tracing mechanism 1A) could reside in a portion of the memory 100 that includes ROM, such as an EPROM module.

In an embodiment, the software tracing mechanism 1 could be implemented using dedicated logic hardware. Examples of such hardware may include connected logic units such as gates and flip-flops, and/or integrated devices, such as application specific integrated circuits (ASICs) and programmable gate arrays (e.g., field programmable gate arrays (FPGAs)) or processors. In some embodiments, such hardware units might be used in lieu of the CPU 92, the memory 100 and other components of the computing system 90, i.e., in a particular machine having dedicated logic circuits.

Accordingly, an optimized two-level trampoline design for tracing computer software program execution has been disclosed.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although various example embodiments have been shown and described, it should be apparent that many variations and alternative embodiments could be implemented in accordance with the disclosure. It is understood, therefore, that the invention is not to be in any way limited except in accordance with the spirit of the appended claims and their equivalents.

What is claimed is:

1. A computer-implemented method for tracing computer software program execution, comprising:
   copying a software instruction stored in a memory location representing an instrumentation point within an original instruction stream of the computer software program;
   replacing the original instruction with a jump instruction at the instrumentation point, the jump instruction causing program control to branch to a multi-level trampoline that includes at least a first-level trampoline and a second-level trampoline;
   the first-level trampoline as loaded being specific to one software tracing probe of multiple different software tracing probes, and the first-level trampoline having a smaller kernel footprint size than the second-level trampoline;
   the second-level trampoline as loaded being generic to the multiple different software tracing probes;
   the first-level trampoline performing initial software-tracing house-keeping operations to preserve partial CPU state, and branching to the second-level trampoline while passing identifying information thereto about the first-level trampoline's one software tracing probe;
   the second-level trampoline performing additional software-tracing house-keeping operations to preserve a remainder of the CPU state, performing software tracing operations in accordance with the first-level trampoline's one software tracing probe, restoring the CPU state that it previously preserved, and returning program control to the first-level trampoline;
   the original software instruction being executed out-of-line or emulated by the first-level trampoline, the second-level trampoline, or any other trampoline that may be part of the multi-level trampoline; and
   the first-level trampoline restoring the CPU state that it previously preserved, and returning program control to the original instruction stream of the computer software program at an instruction determined by a result of the out-of-line execution or emulation of the original instruction.

2. The method of claim 1, wherein the first-level trampoline has a smaller number of instructions than the second-level trampoline.

3. The method of claim 1, wherein there is one second-level trampoline, and plural first-level trampolines each as loaded being specific to a respective software tracing probe.

4. The method of claim 1, wherein the multi-level trampoline includes more than two trampolines for implementing a software tracing probe.

5. The method of claim 4, wherein the multi-level trampoline includes three trampolines for implementing a software tracing probe.

6. The method of claim 1, wherein:
the first-level trampoline, as part of its initial housekeeping operations, allocates a stack frame, saves to the stack frame the contents of one or more CPU registers, saves to the stack frame a return address for returning program control to the original instruction stream, and loads into the one or more saved CPU registers an address of a software tracing probe data structure that defines probe handlers of the first-level trampoline's one software tracing probe and which maintains a copy of the original instruction to be traced;
the first-level trampoline passes to the second-level trampoline the identifying information about the first-level trampoline's one software tracing probe by way of the CPU register that stores the address of the software tracing probe data structure;
the second-level trampoline, as part of its additional software-tracing house-keeping operations, saves all remaining CPU registers that were not saved by the first-level trampoline;
the second-level trampoline implements the software tracing operations by calling all probe-specific handlers associated with the software-tracing probe;
the second-level trampoline either (1) restores the CPU registers that it previously preserved and executes the original instruction out-of-line, or (2) emulates the original instruction and restores the CPU registers that it previously preserved, along with any changes required to reflect the emulation of the original instruction;
following completion of the second-level trampoline, the first-level trampoline restores the CPU state it previously preserved by restoring the one or more CPU registers that it previously preserved, along with any changes required to reflect the execution or emulation of the original instruction, and tears down the stack frame it previously allocated.

7. The method of claim 1, wherein:
the first-level trampoline, as part of its initial housekeeping operations, allocates a stack frame, saves to the stack frame the contents of one or more CPU registers, saves to the stack frame a return address for returning program control to the original instruction stream, and loads into the one or more saved CPU registers an address of a software tracing probe data structure that defines probe handlers of the first-level trampoline's one software tracing probe and which maintains a copy of the original instruction to be traced;
the first-level trampoline passes to the second-level trampoline the identifying information about the first-level trampoline's one software tracing probe by way of the CPU register that stores the address of the software tracing probe data structure;
the second-level trampoline, as part of its additional software-tracing house-keeping operations, saves all remaining CPU registers that were not saved by the first-level trampoline;
the second-level trampoline implements the software tracing operations by calling all probe-specific handlers associated with the software-tracing probe;
the second-level trampoline restores the CPU registers that it previously preserved;
following completion of the second-level trampoline, the first-level trampoline either restores the one or more CPU registers that it previously preserved and executes the original instruction out-of-line, or emulates the original instructions and restores the one or more CPU registers that it previously preserved along with any changes required to reflect the emulation of the original instruction, and tears down the stack frame it previously allocated.

8. A system, comprising:
a CPU;
a computer readable storage medium;
program instructions stored on the computer readable storage medium for execution by the CPU to perform operations for tracing computer software program execution, the operations comprising:
copying a software instruction stored in a memory location representing an instrumentation point within an original instruction stream of the computer software program;
replacing the original instruction with a jump instruction at the instrumentation point, the jump instruction causing program control to branch to a multi-level trampoline that includes at least a first-level trampoline and a second-level trampoline;
the first-level trampoline as loaded being specific to one software tracing probe of multiple different software tracing probes, and the first-level trampoline having a smaller kernel footprint size than the second-level trampoline;
the second-level trampoline as loaded being generic to the multiple different software tracing probes;
the first-level trampoline performing initial software-tracing house-keeping operations to preserve partial CPU state, and branching to the second-level trampoline while passing identifying information thereto about the first-level trampoline's one software tracing probe;
the second-level trampoline performing additional software-tracing house-keeping operations to preserve a remainder of the CPU state, performing software tracing operations in accordance with the first-level trampoline's one software tracing probe, restoring the CPU state that it previously preserved, and returning program control to the first-level trampoline;
the original software instruction being executed out-of-line or emulated by the first-level trampoline, the second-level trampoline, or any other trampoline that may be part of the multi-level trampoline; and
the first-level trampoline restoring the CPU state that it previously preserved, and returning program control to the original instruction stream of the computer software program at an instruction determined by a result of the out-of-line execution or emulation of the original instruction.

9. The system method of claim 8, wherein the first-level trampoline includes a smaller number of instructions than the second-level trampoline.

10. The system of claim 8, wherein there is one second-level trampoline, and plural first-level trampolines each as loaded being specific to a respective software tracing probe.

11. The system of claim 8, wherein the multi-level trampoline includes more than two trampolines for implementing a software tracing probe.

12. The system of claim 11, wherein the multi-level trampoline includes three trampolines for implementing a software tracing probe.

13. The system of claim 8, wherein:
the first-level trampoline, as part of its initial housekeeping operations, allocates a stack frame, saves to the stack frame the contents of one or more CPU registers, saves to the stack frame a return address for returning program control to the original instruction stream, and loads into the one or more saved CPU registers an address of a software tracing probe data structure that defines probe handlers of the first-level trampoline's one software tracing probe and which maintains a copy of the original instruction to be traced;

the first-level trampoline passes to the second-level trampoline the identifying information about the first-level trampoline's one software tracing probe by way of the CPU register that stores the address of the software tracing probe data structure;

the second-level trampoline, as part of its additional software-tracing house-keeping operations, saves all remaining CPU registers that were not saved by the first-level trampoline;

the second-level trampoline implements the software tracing operations by calling all probe-specific handlers associated with the software-tracing probe;

the second-level trampoline either (1) restores the CPU registers that it previously preserved and executes the original instruction out-of-line, or (2) emulates the original instruction and restores the CPU registers that it previously preserved, along with any changes required to reflect the emulation of the original instruction;

following completion of the second-level trampoline, the first-level trampoline restores the CPU state it previously preserved by restoring the one or more CPU registers that it previously preserved, along with any changes required to reflect the execution or emulation of the original instruction, and tears down the stack frame it previously allocated.

14. The system of claim 8, wherein:

the first-level trampoline, as part of its initial house-keeping operations, allocates a stack frame, saves to the stack frame the contents of one or more CPU registers, saves to the stack frame a return address for returning program control to the original instruction stream, and loads into the one or more saved CPU registers an address of a software tracing probe data structure that defines probe handlers of the first-level trampoline's one software tracing probe and which maintains a copy of the original instruction to be traced;

the first-level trampoline passes to the second-level trampoline the identifying information about the first-level trampoline's one software tracing probe by way of the CPU register that stores the address of the software tracing probe data structure;

the second-level trampoline, as part of its additional software-tracing house-keeping operations, saves all remaining CPU registers that were not saved by the first-level trampoline;

the second-level trampoline implements the software tracing operations by calling all probe-specific handlers associated with the software-tracing probe;

the second-level trampoline restores the CPU registers that it previously preserved;

following completion of the second-level trampoline, the first-level trampoline either restores the one or more CPU registers that it previously preserved and executes the original instruction out-of-line, or emulates the original instructions and restores the one or more CPU registers that it previously preserved along with any changes required to reflect the emulation of the original instruction, and tears down the stack frame it previously allocated.

15. A computer program product, comprising:

a computer readable storage medium;

program instructions stored on the computer readable storage medium for execution by a CPU to perform operations for tracing computer software program execution, the operations comprising:

copying a software instruction stored in a memory location representing an instrumentation point within an original instruction stream of the computer software program;

replacing the original instruction with a jump instruction at the instrumentation point, the jump instruction causing program control to branch to a multi-level trampoline that includes at least a first-level trampoline and a second-level trampoline;

the first-level trampoline as loaded being specific to one software tracing probe of multiple different software tracing probes, and the first-level trampoline having a smaller kernel footprint size than the second-level trampoline;

the second-level trampoline as loaded being generic to the multiple different software tracing probes;

the first-level trampoline performing initial software-tracing house-keeping operations to preserve partial CPU state, and branching to the second-level trampoline while passing identifying information thereto about the first-level trampoline's one software tracing probe;

the second-level trampoline performing additional software-tracing house-keeping operations to preserve a remainder of the CPU state, performing software tracing operations in accordance with the first-level trampoline's one software tracing probe, restoring the CPU state that it previously preserved, and returning program control to the first-level trampoline;

the original software instruction being executed out-of-line or emulated by the first-level trampoline, the second-level trampoline, or any other trampoline that may be part of the multi-level trampoline; and the first-level trampoline restoring the CPU state that it previously preserved, and returning program control to the original instruction stream of the computer software program at an instruction determined by a result of the out-of-line execution or emulation of the original instruction.

16. The computer program product of claim 15, wherein the first-level trampoline includes a smaller number of instructions than the second-level trampoline.

17. The computer program product of claim 15, wherein there is one second-level trampoline, and plural first-level trampolines each as loaded being specific to a respective software tracing probe.

18. The computer program product of claim 17, wherein the multi-level trampoline includes more than two trampolines for implementing a software tracing probe.

19. The computer program product of claim 15, wherein:

the first-level trampoline, as part of its initial house-keeping operations, allocates a stack frame, saves to the stack frame the contents of one or more CPU registers, saves to the stack frame a return address for returning program control to the original instruction stream, and loads into the one or more saved CPU registers an address of a software tracing probe data structure that defines probe handlers of the first-level trampoline's one software tracing probe and which maintains a copy of the original instruction to be traced;

the first-level trampoline passes to the second-level trampoline the identifying information about the first-level trampoline's one software tracing probe by way of the CPU register that stores the address of the software tracing probe data structure;

the second-level trampoline, as part of its additional software-tracing house-keeping operations, saves all remaining CPU registers that were not saved by the first-level trampoline;

the second-level trampoline implements the software tracing operations by calling all probe-specific handlers associated with the software-tracing probe;

the second-level trampoline either (1) restores the CPU registers that it previously preserved and executes the original instruction out-of-line, or (2) emulates the original instruction and restores the CPU registers that it previously preserved, along with any changes required to reflect the emulation of the original instruction;

following completion of the second-level trampoline, the first-level trampoline restores the CPU state it previously preserved by restoring the one or more CPU registers that it previously preserved, along with any changes required to reflect the execution or emulation of the original instruction, and tears down the stack frame it previously allocated.

20. The computer program product of claim 15, wherein:

the first-level trampoline, as part of its initial house-keeping operations, allocates a stack frame, saves to the stack frame the contents of one or more CPU registers, saves to the stack frame a return address for returning program control to the original instruction stream, and loads into the one or more saved CPU registers an address of a software tracing probe data structure that defines probe handlers of the first-level trampoline's one software tracing probe and which maintains a copy of the original instruction to be traced;

the first-level trampoline passes to the second-level trampoline the identifying information about the first-level trampoline's one software tracing probe by way of the CPU register that stores the address of the software tracing probe data structure;

the second-level trampoline, as part of its additional software-tracing house-keeping operations, saves all remaining CPU registers that were not saved by the first-level trampoline;

the second-level trampoline implements the software tracing operations by calling all probe-specific handlers associated with the software-tracing probe;

the second-level trampoline restores the CPU registers that it previously preserved;

following completion of the second-level trampoline, the first-level trampoline either restores the one or more CPU registers that it previously preserved and executes the original instruction out-of-line, or emulates the original instructions and restores the one or more CPU registers that it previously preserved along with any changes required to reflect the emulation of the original instruction, and tears down the stack frame it previously allocated.

* * * * *

UNITED STATES PATENT AND TRADEMARK OFFICE
CERTIFICATE OF CORRECTION

PATENT NO. : 10,884,899 B2
APPLICATION NO. : 16/148126
DATED : January 5, 2021
INVENTOR(S) : Rao et al.

Page 1 of 1

It is certified that error appears in the above-identified patent and that said Letters Patent is hereby corrected as shown below:

On the Title Page

Item (72), Line 2, In the Inventor: Delete "Ananth N. Mavinakayanahalli" and insert -- Ananth Narayan M G. --

Signed and Sealed this
Sixth Day of July, 2021

Drew Hirshfeld
*Performing the Functions and Duties of the*
*Under Secretary of Commerce for Intellectual Property and*
*Director of the United States Patent and Trademark Office*